Dec. 30, 1969  H. L. BURGESS  3,486,556

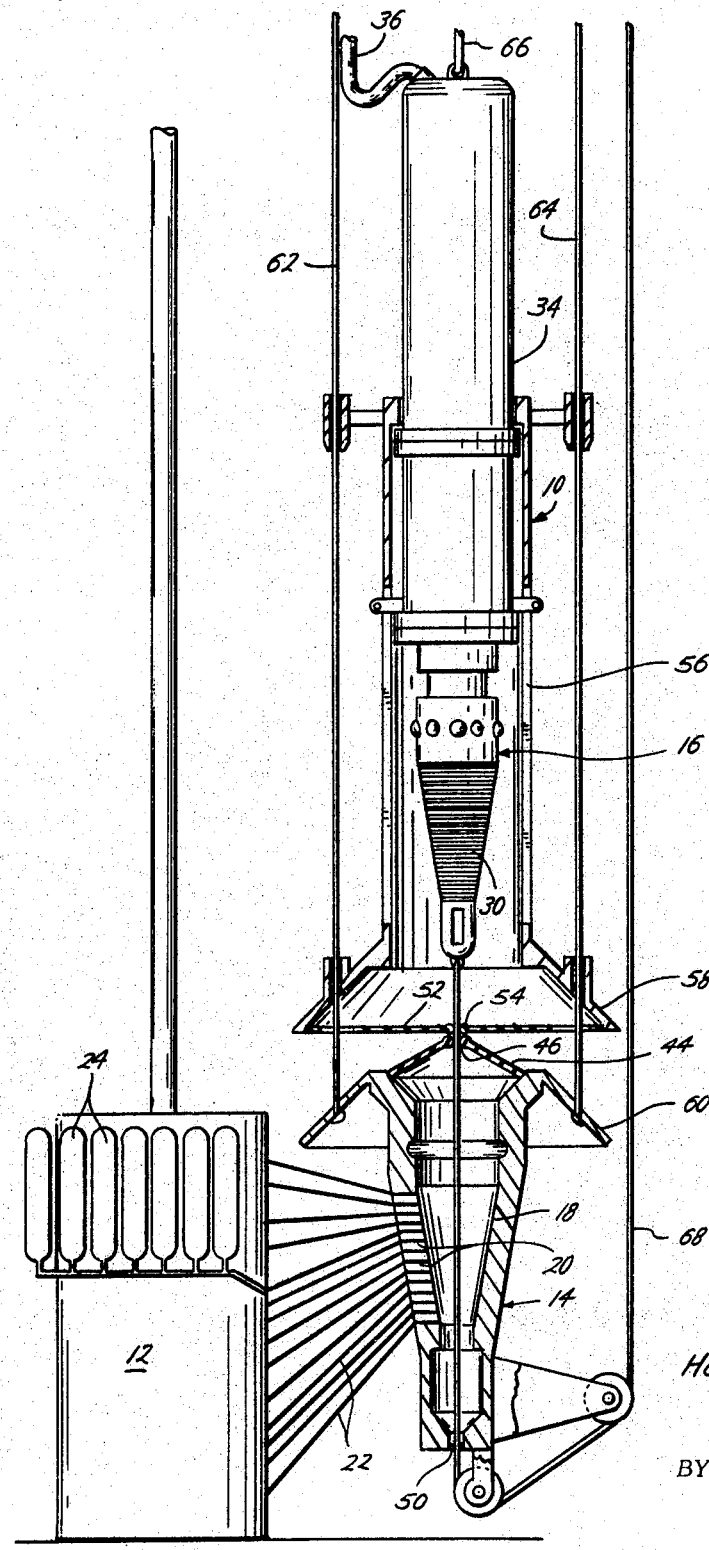

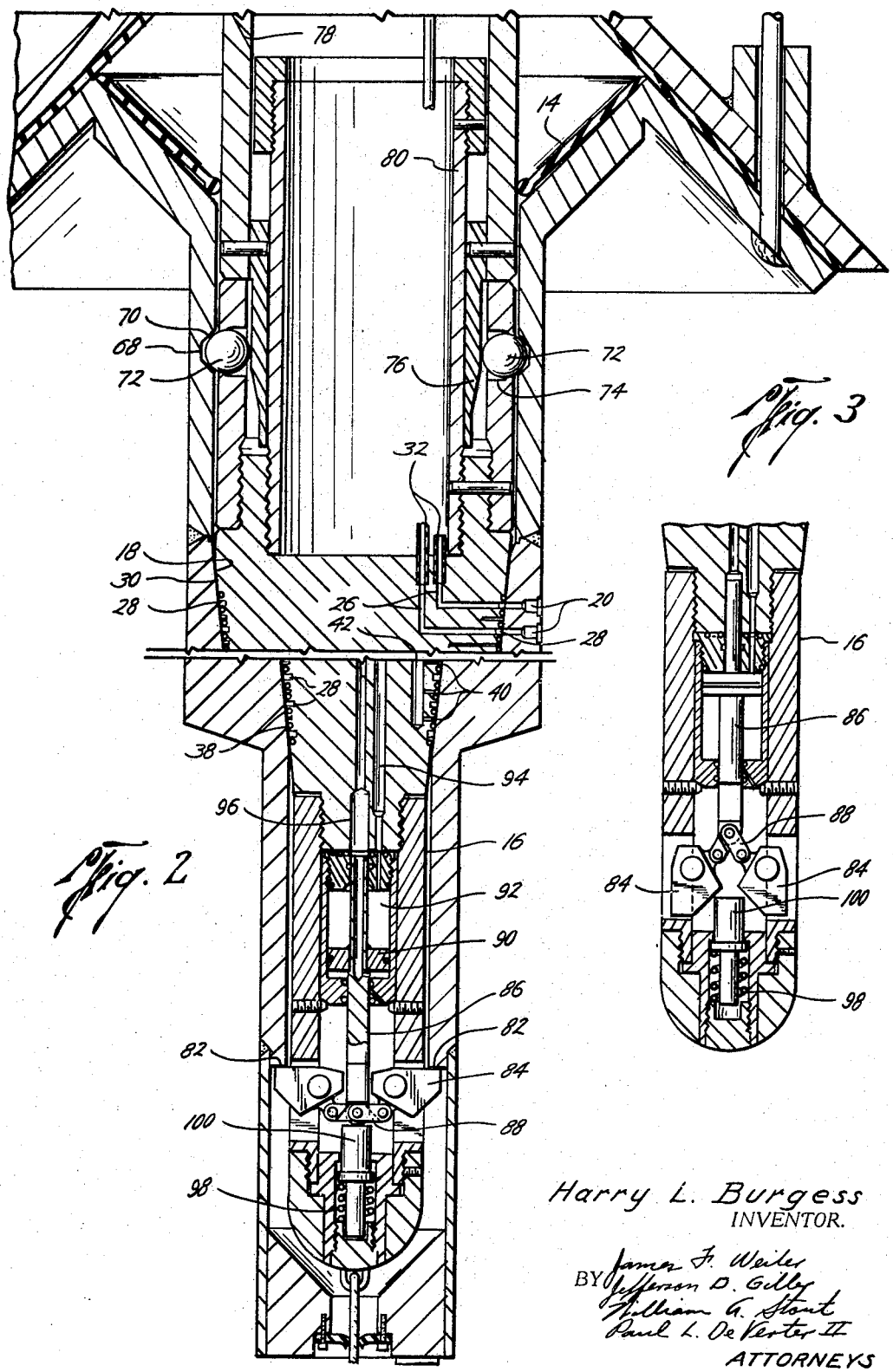

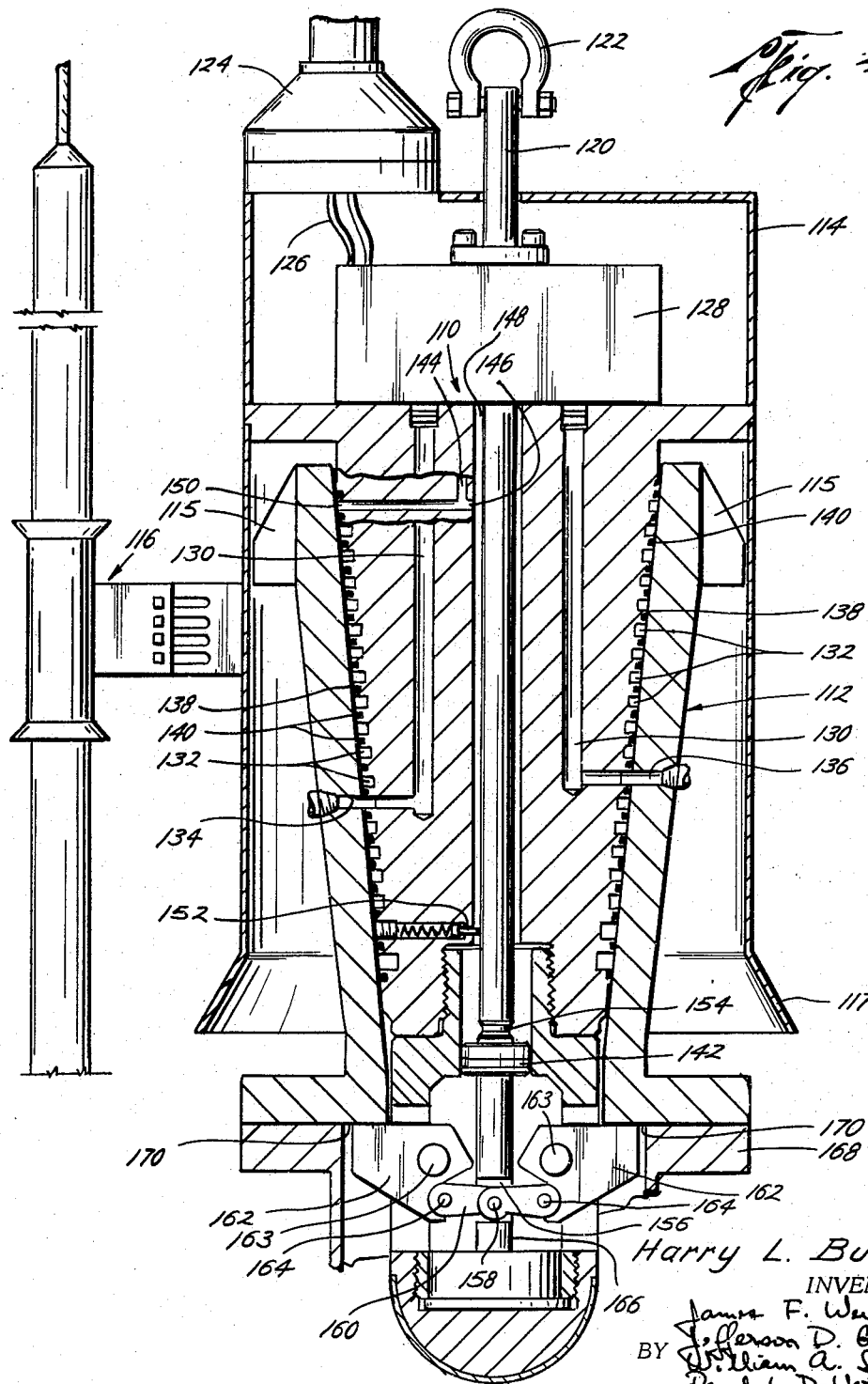

UNDERWATER CONNECTING APPARATUS

Original Filed March 15, 1965  6 Sheets-Sheet 4

Harry L. Burgess
INVENTOR

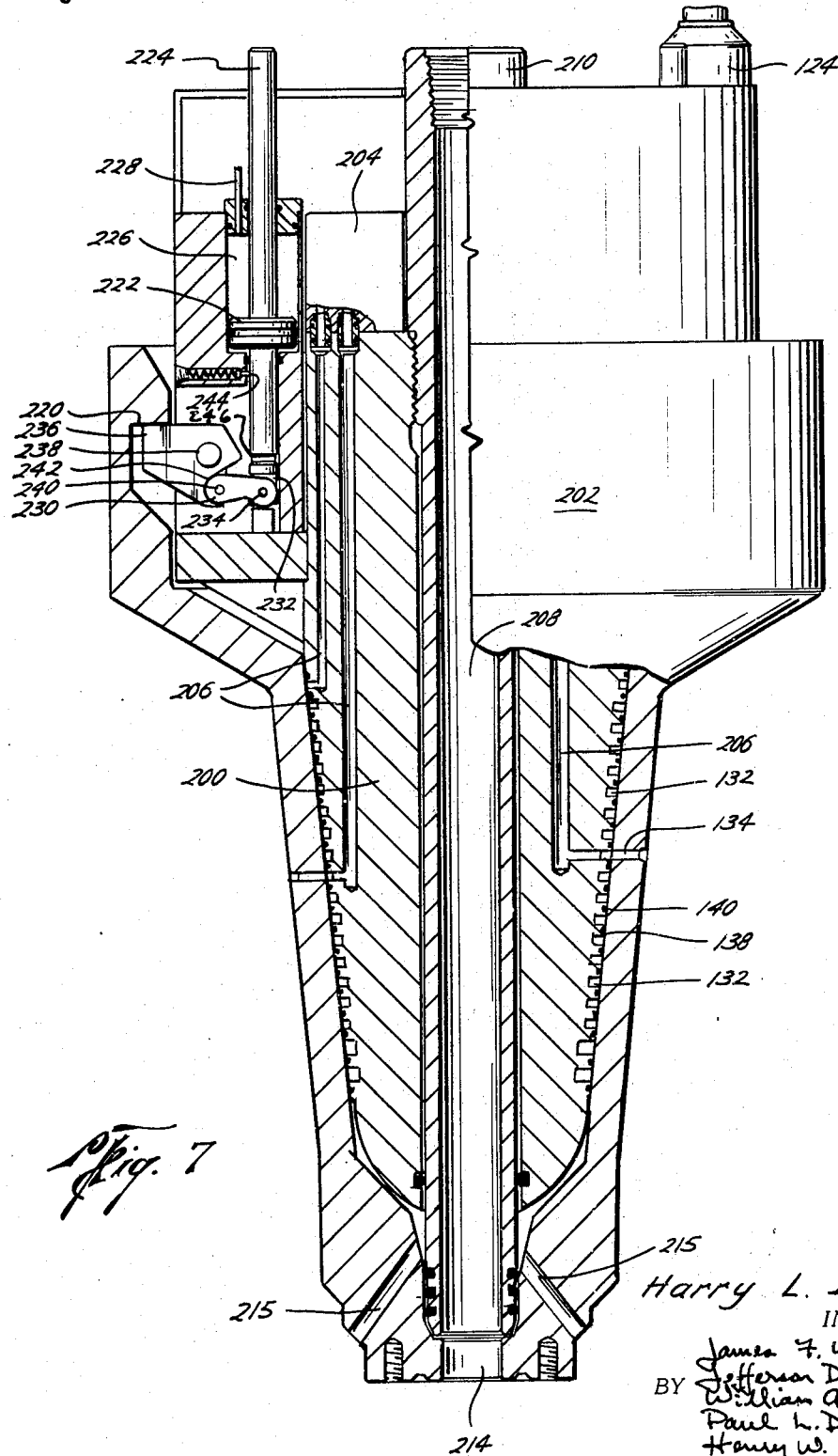

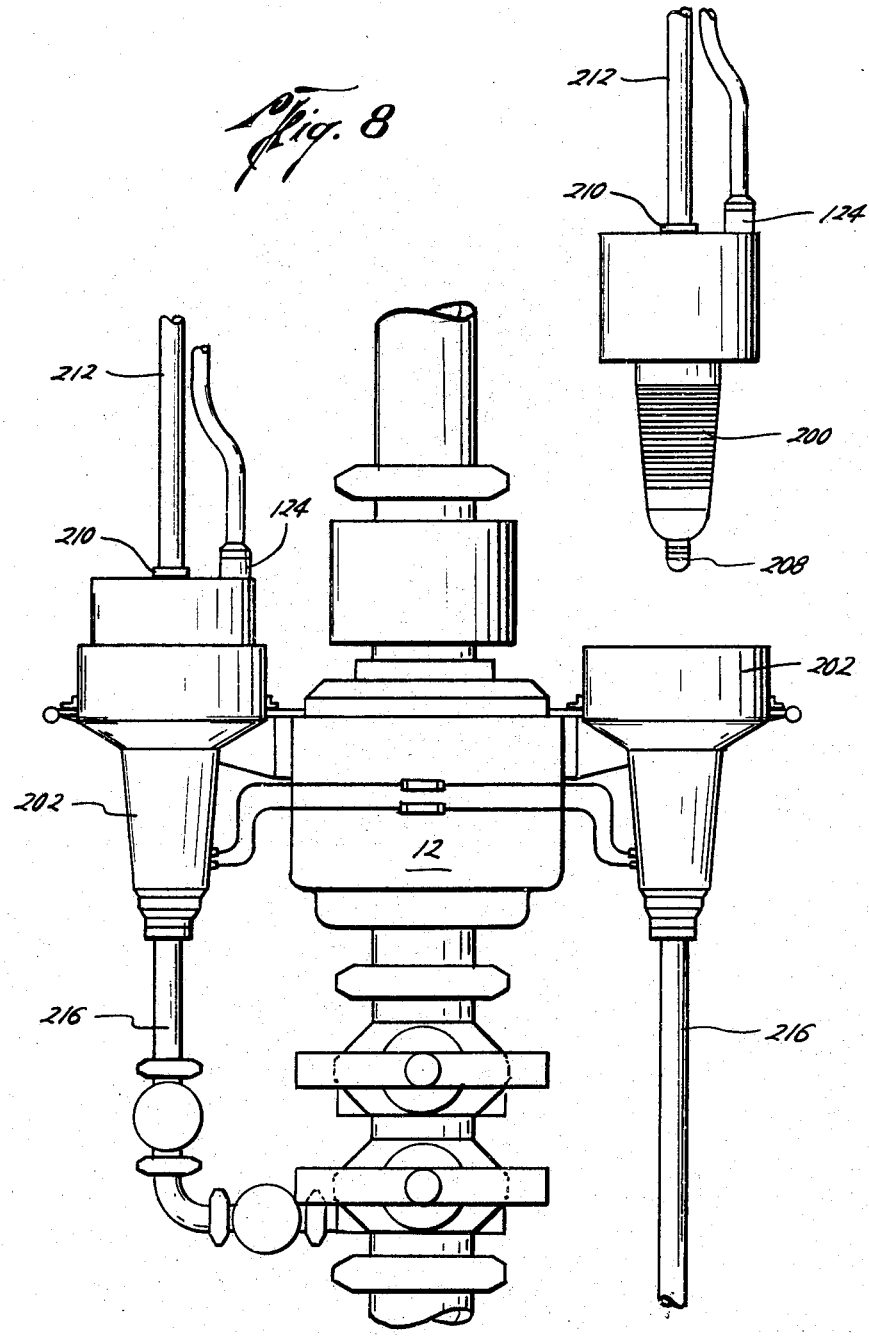

United States Patent Office 3,486,556
Patented Dec. 30, 1969

3,486,556
UNDERWATER CONNECTING APPARATUS
Harry L. Burgess, Houston, Tex., assignor, by mesne assignments, to C. Jim Stewart & Stevenson, Inc., Houston, Tex., a corporation of Texas
Continuation of application Ser. No. 439,719, Mar. 15, 1965. This application May 1, 1967, Ser. No. 634,923
Int. Cl. E21b 33/035, 7/12, 43/01
U.S. Cl. 166—.6
18 Claims

ABSTRACT OF THE DISCLOSURE

The present invention relates to underwater connecting apparatus, and more particularly, relates to apparatus for providing an underwater connection to control remotely devices which are positioned beneath the water surface.

CROSS-REFERENCES TO RELATED APPLICATIONS

The present application is a continuing application of my earlier filed application Ser. No. 439,719, filed Mar. 15, 1965, and entitled Underwater Connecting Apparatus, now abandoned.

BACKGROUND OF THE INVENTION

The present invention is directed to apparatus for easily and quickly connecting and disconnecting hydraulic control lines leading from remote controls to underwater equipment.

In the petroleum industry, there is an increasing practice to drill wells on the ocean floor. Wells which are drilled on ocean or waterway floors generally utilize means for controlling the underwater equipment. Since it is not feasible to operate this underwater equipment manually, the control of this equipment is generally done by remote control from the water surface. However, it is necessary to connect and disconnect all of the control lines leading to the wellhead equipment in a quick manner during emergencies or when moving from one location to another. There are presently some devices that will provide underwater connection, such as shown in Patent No. 2,990,851, and it is to various improvements in these types of underwater connectors that the present invention is directed.

SUMMARY OF THE INVENTION

The present invention utilizes a tapered stinger and receptacle having both metal and flexible sealing surfaces to provide the connecting apparatus. Guide means are utilized to properly guide the stinger into the receptacle. Coacting passageways in the mating wall of the stinger and the receptacle provide the means for conveying the controlling hydraulic fluids to the equipment to be controlled. Shields and closure members are also provided to prevent damage by water or the growth of sea life on the stinger and receptacle when not connected together.

Locking means are employed to interlock the stinger in the receptacle, thereby insuring a tight and lasting fit. In one embodiment, through-center positioning of the locking mean's actuating linkage is achieved, whereby premature disengagement of the stinger is prevented. The present invention also utilizes a vent passageway located in a sealing surface of the stinger to release the hydraulic fluid which actuates the locking means until the sealing surface contacts the mating receptacle sealing surface, thus insuring the proper timing for the actuation of the locking means. In addition, provision is made for the inclusion of a choke or kill line in the stinger.

Generally, it is an object of the present invention to provide an underwater connecting means for providing a quick and effective connection and disconnection of all control lines leading to underwater equipment.

A further object of the present invention is the provision of an underwater connecting apparatus having a receptacle having an opening therein into which a tapered stinger is adapted to be telescoped into and out of, and in which the receptacle and stinger have coacting fluid passageways when the stinger is seated therein and the receptacle and stinger have tapered coacting metal sealing surfaces for providing high pressure seals.

Yet, a further object of the present invention is the improvement in an underwater connecting apparatus wherein a tapered stinger is adapted to be telescoped into and out of a receptacle having a tapered opening, and the stinger and receptacle have a plurality of coacting fluid control passageways in which the fluid passageways are sealed by annular resilient sealing means and annular coacting metal sealing surfaces to provide a high pressure sealing surface.

Still a further object of the present invention is the provision of an underwater connector having a receptacle adapted to telescopically receive a stinger for connecting of control passages in which a pair of annular seals are provided between adjacent control passageways and a vent line leads from between each pair of sealing surfaces to prevent cross control of the control systems in the event of failure of any of the seals.

Still a further object of the present invention is the provision of an underwater connecting apparatus having a receptacle provided with an opening for telescopically receiving a stinger in which a protecting shield is disposed about and is either fixedly or slidably connected to the stinger, and guide means are provided for telescopically aligning the stinger for insertion into the receptacle and which the various sealing surfaces between the stinger and receptacle are protected.

Yet a still further object of the present invention is the provision of an underwater connecting apparatus wherein a receptacle is adapted to telescopically receive a stinger for connecting control passageways therethrough in which the stinger includes an annular protective shield enclosing the stinger with the bottom of the shield including a resilient closure means having a normally closed slot which prevents seaweed or other debris from entering therein while the stinger is being lowered into the water towards the receptacle, but which allows the stinger to pass through the slot for insertion into the receptacle.

Yet a further object of the present invention is the provision of an underwater connecting apparatus having a receptacle adapted to telescopically receive a stinger in which the receptacle and stinger have coacting control passageways in which releasable interlocking members are provided to securely interlock the receptacle and stinger when the singer is seated in the receptacle.

Yet a still further object of the present invention is the provision of an underwater connecting apparatus wherein a receptacle is adapted to telescopically receive a stinger for connecting control passageways therethrough having releasable interlocking means which insures sealing at the proper time of contact and which prevents the premature disconnection of the stinger from the receptacle.

Other and further objects, features and advantages will be apparent from the following description of a presently-preferred embodiment of the invention, given for the purpose of disclosure and taken in conjunction with the accompanying drawings.

BRIEF DESCRIPTION OF THE DRAWINGS

Like character references designate like parts throughout the several views of the drawings, which are as follows:

FIGURE 1 is an elevational view of the present invention, partly in cross section, showing the apparatus in its disconnected position, FIGURE 2 is an enlarged fragmentary elevation view, in cross section, of the present invention in its connected position, FIGURE 3 is an enlarged fragmentary elevation view, in cross section, of one form of interlocking means, FIGURE 4 is an enlarged fragmentary elevational view, in cross section, of a second preferred embodiment of the present invention in its connected position, FIGURE 7 is an enlarged elevational view of a third embodiment of the present invention, partially in cross section, and FIGURE 8 is an elevational view of the embodiment shown in FIGURE 7 as it would be used.

BRIEF DESCRIPTION OF THE PREFERRED EMBODIMENTS

Figure 5:
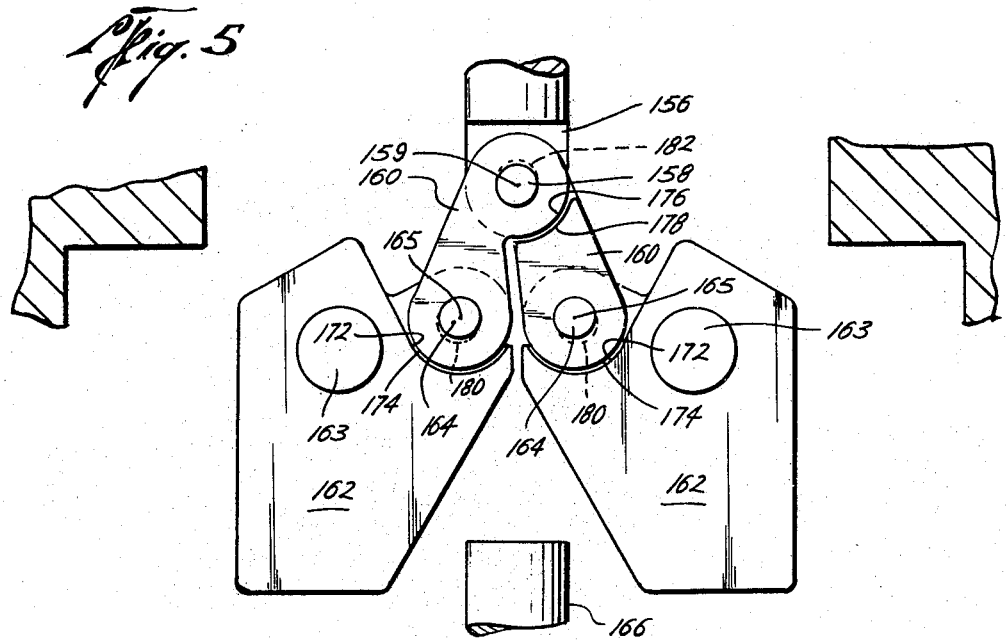
FIGURE 5 is an elevational view of the interlocking means shown in FIGURE 4 on an enlarged scale and in its disengaged position.

Referring now to the drawings, and particularly to FIGURE 1, the reference numeral 10 generally indicates the apparatus of the present invention for providing an underwater connection of the necessary controls leading to underwater equipment, for example, wellhead equipment such as a conventional blowout preventer 12. Normally, underwater equipment such as a blowout preventer 12 includes numerous controls for various operations which are generally controlled by hydraulic or pneumatic control lines leading to the water surface and controlled from above the water. The present apparatus 10 generally includes a receptacle 14 normally positioned underwater and connected to the well-head equipment 12, and a stinger 16 which is telescopically movable into and out of the receptacle 14 for connection of various control systems to the well equipment 12.

The receptacle 14 includes an opening 18, preferably extending through the top and bottom of the receptacle and preferably tapered for reasons more fully described hereinafter. A plurality of fluid passageways 20 are provided in the receptacle 14 extending from the inside opening 18 to the outside of the receptacle and there connected by to individual control lines 22 to individual operational control devices on the well equipment 12, and in the event that power equipment such as accumulators 24 are connected underwater to such accumulators for recharging purposes.

Referring now to FIGURES 1 and 2, the stinger 16 also includes a plurality of passageways 26, only two of which are shown for convenience, and each of which extends to one of a plurality of annular recesses 28 spaced along the outer periphery of a tapered portion 30 of the stinger 16. When the stinger 16 is seated in the receptacle 14, each of the stringer passageways 26 and annular recesses 28 are aligned with and in fluid communication with one of the fluid passageways 20 in the receptacle 14. A conduit 32 leads from each of the stinger passageways 26 up to the control and possibly power section 34 which is connected to the top of the stinger 16 (FIGURE 1). A suitable control and/or power cable 36 leads from section 34 to the water surface for controlling and actuating the various control units on the wellhead equipment 12.

Referring now to FIGURE 2, a suitable resilient annular seal 38, and preferably two resilient annular seals 38 are provided between adjacent recesses 28 to seal off the separate control systems from each other. In addition to the resilient seals, because of the metal to metal contact of the tapering surfaces 18 and 30 a metal to metal taper seal will be provided on each side of the recesses 28 to provide additional sealing action when the stringer 16 is securely seated in the receptacle 14. Because of the fact that the tapering surface 30 of the stinger 16 coacts with the internal taper of the opening 18 of the receptacle 14, a high-pressure seal is provided by the combination resilient and metal seals.

However, as an additional precaution, an annular vent recess 40 may be provided between each pair of resilient seals 38 between the annular recesses 28 and led to a vent manifold 42. Thus, in the vent that a combination of a metal seal and a resilient seal fails on one side of a control system, the fluid in that system will be vented off thus preventing any danger of the fluid being forced into and actuating some other control system than the one desired. Thus, the vent system prevents cross control of the individual control systems.

Of course, while the stinger 16 is seated in the receptacle 14, the critical sealing surfaces of contact will not be subjected to the corrosion of the water and marine growth. However, when the stinger 16 is removed from the receptacle 14, it is desirable to suitably protect the interior of the receptacle 14 to prevent marine growth such as barnacles which would interfere with the operation and reseating of the stinger 16 in the receptacle 14. It has been found that marine growth such as barnacles are inhibited if the water is prevented from being circulated through the interior of the receptacle 14. Thus, by providing a flexible closure member 44 covering the top of the opening 18 of the receptacle 14, the circulation of water through the interior of the receptacle 14 is prevented. The closure member 44 is secured to the upper edge of the receptacle 14 and includes a slot 46 which is normally closed to prevent circulation of water therethrough but, as best seen in FIGURE 2, is resiliently openable to allow the passage of the stinger 16 into the receptacle 14. Similarly, if the opening 18 extends through the bottom end of the receptacle 14, which is desirable to expel the water from the receptacle 14 when the stinger 16 is seated therein a similar flexible closure means 50 is provided.

In addition, a similar closure member 52 having a slot 54 is provided around the lower end of the stinger 16 to prevent seaweed and other debris from contacting the tapered seating surface 30 of the stinger 16 as it is lowered through the water. The member 52 is supported from a protecting shield 56 which is slidably connected to the stinger body 16. The protecting shield 56 preferably includes a funnel shaped portion 58 at the bottom for coacting with a second reverse funnel shaped portion 60 of the receptacle 14. The coaction of the two funnel shaped sections 58 and 60 when they engage acts to align the stinger on the longitudinal axis of the receptacle 14 and protects both the seating surfaces on the tapered section 30 of the stinger and along the interior of the receptacle 14. In addition, the protecting shield 56 acts to protect the sealing surfaces 30 of the stinger 16 when the stinger is being handled above the water.

Additional aligning means such as guide cables 62 and 64 may be provided connected at their bottom to the receptacle 14 on which the stinger 16 may be raised and lowered by a suitable support cable 66. Or if desired, a pull cable 68 may be provided as an alternative and in place of the guide cable 62 and 64 to align the stinger 16 relative to the receptacle 14.

Of course, it is desirable that suitable releasable interlocking means be provided between the stinger 16 and the receptacle 14 to hold them securely together when high pressures are being flowed through the various control systems to operate the underwater equipment 12. Thus, referring to FIGURE 2, one suitable type of interlocking means is shown wherein a notch 68 is provided in the interior of the receptacle 14 having an upwardly tapered shoulder 70. A plurality of locking balls 72 are carried by the stinger 16 in an opening 74 tapered outwardly to allow the balls to move transversely to the axis of the stinger 16. Suitable wedge members 76 are provided connected to support members 78 and slidable relative to the interior housing 80 of the stinger 16. Thus, when the stinger 16 is moved into the receptacle 14 and the balls 72 are aligned with the notches 68 a further downward movement of the support members 78 will move the wedge members 76 downwardly thereby forcing the balls 72 into the notches 68 and interlocking the stinger 16 relative to the receptacle 14. On disconnection, the opposite procedure is followed with the support member 78 being pulled upwardly thereby removing the wedge member 76 from behind the balls 72 and thus when the stinger 16 is moved upwardly the balls 72 will be deflected inwardly by the tapered shoulders 70 back into the interior of the slot 74 and the stinger may be removed.

Referring now to FIGURES 2 and 3 another suitable interlocking means may be used in combination with or as an alternative to the above described locking mechanism. Thus, a pair of locking shoulders 82 may be provided on the receptacle 14. A pair of pivotally mounted levers 84 are provided connected to the lower end of the stinger 16. A plunger 86 is connected to the levers 84 by suitable actuating links 88. Thus, on downward movement of the plunger 86 the links 88 will rotate the levers 84 outwardly and into engagement with the shoulders 82 to interlock the stinger 16 and receptacle 14. The actuating mechanism may be a suitable hydraulic piston 90 and cylinder 92 controlled by fluid passing through hydraulic lines 94 and 96 on either side of the piston. In addition, a suitable spring 98 is provided to act against a releasing member 100 which yieldably acts against the lower end of the plunger 86 when it is in locking position, as best shown in FIGURE 2, to act in a direction to release the levers 82 from their locking position. Thus, in the event that the hydraulic fluid pressure fails the levers 82 may be automatically released for disconnection of the stinger 16. Thus, a fail safe releasably interlocking mechanism is provided.

In operation, and referring to FIGURE 1, suitable well equipment such as a blow-out preventer 12 is mounted below the surface of water at a wellhead. The receptacle 14 of the present invention is also normally positioned adjacent and connected to the well equipment 12. Suitable individual control lines 22 directed to the various operational points on the well equipment 12 are individually connected to receptacle passages 20 leading to the interior of the receptacle 14 for alignment with the proper control passages in the stinger 16. Thus, when it is desired to control the well equipment 12, stinger 16 is lowered by the support cable 66 on either suitable guide lines 62 and 64 or guide cable 68. It is noted that these various guide cables will act to align the stinger 16 for telescoping movement along the longitudinal axis of the receptacle 14 to prevent damage to the sealing surfaces 30 on the stinger and the coacting surfaces of the interior of the receptacle 14. It is also noted that the protective shield 56 including the resilient member 52 protects the stinger 16 and prevents the entry of seaweed or other debris onto the stinger during the lowering process. The funnels 58 and 60 also coact to properly align the stinger 16 with the receptacle opening 18. The stinger 16, as it is lowered, will pass through the slot 54 into the resilient closure member 52 and through the slot 46 in the closure member 44 to enter the opening 18 of the receptacle 14. And any water in the opening 18 will be pushed out the bottom of the receptacle 14 through the member 50.

Referring now to FIGURES 1 and 2, the annular sealing portion 30 of the stinger 16 will seat itself on the taper of the opening 18 whereby each of the annular recesses 28 will be properly aligned with one of the passages 20 in the receptacle 14. Either or both of the interlocking means may be actuated to suitably interlock the stinger 16 with the receptacle 14. Because of the tapering seating surface, the annular resilient seals 38 and the metal to metal seating surfaces on either side of the recesses 28, a high pressure seal is provided. However, in the event that a combination of one of the metal to metal seals and a resilient seal on one side of one of the recesses 28 fails, the fluid passing through that control system will pass through the vent manifold 42 to prevent any cross actuation of other control systems.

Thus, actuation of suitable operational units on the well equipment 12 may be provided from the control and/or power cable 36 which leads to the surface to control a suitable control system and/or power system, which may be conventional located in section 34.

In addition, it is noted that when the stinger 16 is out of the receptacle 14 the resilient closure member 44 and 50 will prevent the circulation of water through the receptacle 14 and inhibits the growth of marine life.

Turning now to the embodiment disclosed in FIGURE 4, the construction of the stinger 110 and the receptacle 112 is essentally the same as that of the embodiments disclosed in FIGURES 1 and 2. In this embodiment, however, the shield 114 on the stinger is fixedly attached to the stinger and telescopes over the receptacle 112. Guide means generally indicated by the numeral 116 is utilized on the shield 114 to properly position the stinger for being received by the receptacle. A rod 120 extends through the stinger and connects to the interlocking means at its lowermost end. A generally U-shaped element 122 is connected at the uppermost end of the rod 120 and serves as attaching means for a raising and lowering cable (not shown). A junction box 124 is located on the top of the shield 114 and provides an entry means for the fluid conveying lines 126 (only two of which are shown) into the shield 114.

Suitable passageways 130 extend through the stinger 110 and connect with the annular passageways 132, which in turn, mate with the passageways 134 in the receptacle wall.

Between the annular passageways are tapered metal sealing surfaces 138. Located in these sealing surfaces are resilient sealing means 140. These sealing surfaces 138 and resilient sealing means 140 function in the same manner as in the first embodiment. In this second embodiment, however, the vent passageways 40 have been eliminated.

Figure 6:
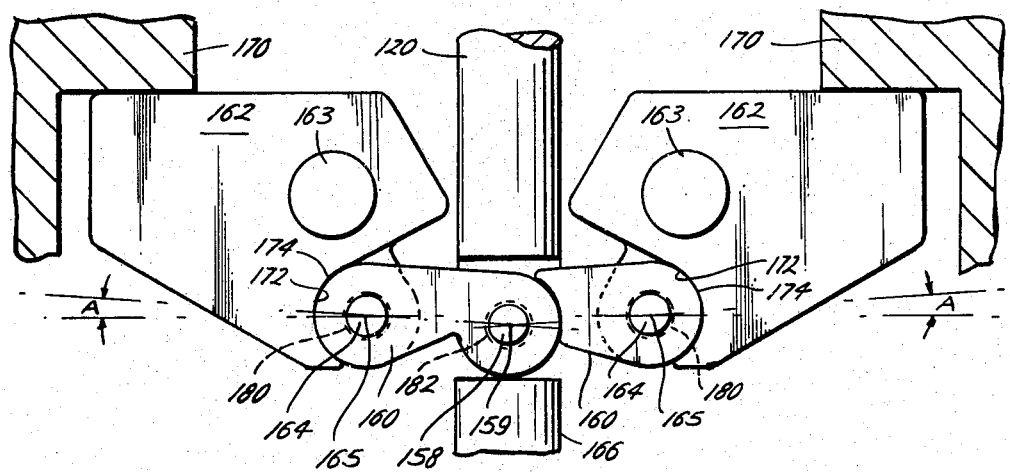
FIGURE 6 is an elevational view of the interlocking means shown in FIGURE 5 in its engaged position.

Turning now to the interlocking means disclosed in this embodiment and also referring to FIGURES 5 and 6, mounted on the lowermost portion of the rod 120 is a piston 142. A passageway 144 extends downwardly from the valve block through a stinger and has a first outlet 146 which connects the passageway 144 with a piston chamber 148. As can be seen from FIGURE 4, the piston 142 is located in the lowermost portion of this chamber 148. Proper sliding seals are maintained at both ends of the chamber 148. A second outlet 150 is also connected to the passageway 144 and is located in the tapered metal sealing surface of the stinger 110.

A spring biased pin 152 is located in the lower portion of the passageway 148 and coacts with the annular groove 154 in the rod 120 to provide a releasable securing means for the interlocking means when in its disengaged or raised position.

Located on the lowermost end of the rod 120 is a flat portion 156 through which a pin 158 extends, the pin having a central pivotal axis 159. Actuating links 160 are pivotally connected to the pin 158. At the outermost ends of the links 160 levers 162 are connected by means of the pins 164 which have central pivotal axes 165. The levers 162 are pivotally attached to the stinger 110 by pins 163. A stop 166 is located in the forwardmost or nose portion of the stinger. Interlocking shoulders 170 are formed as part of the receptacle by the mounting base 168 being of a larger diameter than the lowermost portion of the receptacle 112.

Turning now to FIGURES 5 and 6, there is shown enlarged views of the interlocking links and levers. Load-bearing shoulders 172 are located on each lever 162. Mating surfaces 174 are located on each of the links 160. In like manner, load-bearing surfaces 176 and 178 are located on the links themselves. As shown by the dotted lined 180, the openings in the levers 162 for the pins 164 are dimensioned significally larger in diameter than the diameter of the pins 164. In this manner a loose fit is achived at these pivot points. In like manner, the opening 182 through the right-hand pin 160, as viewed in FIGURES 5 and 6, has also been dimensioned larger than the pin 158.

Turning now to the operation of this embodiment, the male member or stringer 110 is lowered into the female member or receptacle 112 in the same manner as before by means of a cable attached to the element 122. Due to the weight of the stringer, the shaft 120 would be in its raised position, whereby the interlocking means would assume the position shown in FIGURES 3 and 5. The spring biased pin 152 would engage the groove 154 to releasably hold the interlocking means in this position until the piston is positively displaced by hydraulic action. The guide means 116 will properly orient the stringer 110 and it will telescope into the receptacle 112 as shield 114 telescopes over the receptacle. Additional guiding means is furnished by the sloping shoulders 115 coacting with the flanged lower portion 117 of the shield 114. The outer surfaces of the flange 115 will continue to guide the shield and the stringer 110 as they are lowered. Although the flexible closure members utilized in FIGURE 1 have been omitted from this embodiment, it is to be understood that they may be utilized if desired.

In this embodiment, the interlocking of the stringer within the receptacle automatically takes place when the stringer has been properly positioned within the receptacle. Hydraulic fluid is continuously pumped through the passageway 144 and exits through the outlets 146 and 150. As will be readily understood, the chamber 148 will soon become filled with the hydraulic fluid, and the resistance offered by the piston 142 and the spring biased pin 152 will cause the hydraulic fluid to exit through the outlet 150.

When the sealing surfaces of the stringer and receptacle mate, however, the outlet 150 will be effectively sealed. At this point, the hydraulic fluid will be forced into the chamber 148 which will, in turn, force the piston 142 downwardly, actuating the interlocking means as in the first-discussed embodiment. As is readily seen, therefore, no premature actuation of the interlocking means can occur until the stringer 110 is properly positioned within the receptacle 112, whereby outlet 150 will be sealed. Any action due to waves or the like causing the barge from which the stringer is being lowered to rise or fall will close the outlet 150 only temporarily. Such would be insufficient to cause the interlocking means to extend fully.

Turning now particularly to FIGURES 5 and 6 and to the load-bearing shoulders 172, 174, 176 and 178, as can be seen in FIGURE 5 when the interlocking means is in its closed or inoperative position, the load-bearing shoulders are spaced from their respective mating shoulders. When extending to its operative or interlocked position shown in FIGURES 4 and 6, the shoulders mate. Due to the loose fit about the pins 158 and 164, all of load received by the levers 162 from its interlocking connection with the receptacle is borne directly on these load-bearing shoulders. Accordingly, no shearing force is placed on the pins 158 and 164. As a result, substantial loss and down time due to the shearing of these pins and the resultant damage and inoperability of the equipment involved is prevented.

The embodiment shown in FIGURES 4, 5 and 6 also utilizes a through-center position for the actuating links 160 to insure a continued interlocking of the stringer 110 within the receptacle 112 should the hydraulic pressure in the chamber 148 fail. As can best be seen in FIGURE 6, the central pivoting axes 165 of the pins 164 are located above the central pivotal axis 159 of the pin 158. This is shown by the angles A. In this embodiment, the central pivotal axes 165 rotate from below the central pivotal axes 159 to above it. The angle of rotation above the axes 159 need not be large. Once this through-center position is reached, should the hydraulic pressure in the chamber 148 fail, the interlocking means will remain in its locked position. Only when a positive upward force is exerted on the shaft 120 will the interlocking means return to its inoperative position.

The advantages of this arrangement can be readily seen by one skilled in the art. The pressure in the chamber 148 could fail for a number of reasons and, should the stringer disengage from the receptacle, substantial lost time could result. In the present invention, should the pressure fail, for example by the hydraulic line breaking, the stringer will remain in place indefinitely. Only a positive pull upwardly on the rod 120 will release the stinger. Therefore, once the stinger is in position, it will remain there. It is, of course, understood that this through-center positioning of the actuating links may be utilized on any of the embodiments discussed herein. In like manner, the use of the load-bearing shoulders on the links and levers may also be utilized in any of the embodiments.

Turning now to the embodiment disclosed in FIGURES 7 and 8, a stinger arrangement is disclosed having provision therein for a choke or kill line extending therethrough for connection with the underwater apparatus. As is well known in the oil drilling art, it is sometimes necessary to direct a choke or kill line into the well. The present invention provides a convenient and simple apparatus for doing this for underwater wells.

Once again, the stinger 120 is adapted to be positioned within the receptacle 202. A valve block 204 is located on the stinger and passageways 206 extend through the stinger from the valve block 204 and mate in fluid communication with the receptacle passageways as before. As with the last embodiment, the flexible closure members shown in the first-discussed embodiment are not disclosed but may be utilized if desired. Furthermore, in the embodiment shown in FIGURES 7 and 8, the outer-protective shield for the stinger is not shown for the purposes of simplicity.

Extending longitudinally through the central portion of the stinger 200 is a large passageway 208. A connecting member 210 is attached to a line 212 extending from the surface of the water centrally disposed in the bottom of the receptacle 202 is the passageway 214 which mates with the pasageway 208. The hose bundle and suitable connector 124 is connected to the top of the stinger as with the previously discussed embodiments. The passageway 214 is in fluid communication with the line 216 which in turn connects with the well-head equipment 12. In FIGURE 8, one stinger 200 is shown being lowered into the receptacle, while the stinger 200 on the left-hand side, as viewed in FIGURE 8, is shown connected within its receptacle 202. Also located in the bottom of the receptacle 202 are passageways 205.

The interlocking means disclosed in FIGURE 7 is quite similar to that disclosed in FIGURE 4 excepting that it is located near the top of the receptacle 202 and stinger 200 to allow for passageway 208. Furthermore, although only one interlocking device is shown, it is, of course, understood that a plurality of these may be utilized around the interior of the receptacle.

A shoulder 220 is located near the top of the receptacle 202 and adjacent to the opening within which the stinger 200 fits. A piston 222 is connected to a shaft 224 for reciprocal movement within the chamber 226. A hose 228 (only partially shown) supplies hydraulic fluid to the chamber 226. The actuating link 230 is connected to the lowermost end 232 of the shaft 224 by means of the pin 234. The pin 234 is connected to the link 230 in a loose fit to allow the link to bear against the adjacent wall of the stinger 200, whereby any load will be carried by this wall rather than by the pin 234.

A lever 236 is pivotally connected at 238 to the stinger 200. The lever is also pivotally connected by the pin 240 to the link 230. The load-bearing surfaces on the lever 236 and on the link 230 at 242 as with the last-discussed embodiment. Accordingly, the fit for the pin 240, as with pin 234, should be a loose one.

As with the last embodiment, a through-center position with regard to the central pivotal axes of the pins 234 and 240 is achieved, whereby the interlocking means will not release should the hydraulic pressure in chamber 226 fail. Furthermore, a spring biased pin 244 coacts with the annular groove 246 when the interlocking means is in its raised or inoperative position to hold the interlocking means in this position.

The operation of this embodiment is essentially the same as with the other embodiments, the stinger 200 being lowered into the receptacle 202 by means of a cable and guide means (not shown). As the stinger enters the receptacle, sea water is forced out of the receptacle through the passageways 215. As before, the interlocking means securely locks the stinger within the receptacle. The choke or kill fluid may be injected into the well if desired.

The present invention, therefore, is well adapted to carry out the objects and attain the ends and advantages mentioned as well as others inherent therein. While a presently-preferred embodiment of the invention is given for the purpose of disclosure, numerous changes in the details of construction and arrangement of parts may be made which will readily suggest themselves to those skilled in the art and which are encompassed within the spirit of the invention and the scope of the appended claims.

What is claimed is:

1. An underwater connecting apparatus comprising,
a receptacle adapted to be positioned underwater, and having,
a top and bottom,
an opening extending from the top to the bottom,
a tapered stinger adapted to be telescoped into and out of said receptacle,
said receptacle opening and stinger having mating sidewalls that are gradually tapered from top to bottom, to form coacting metal sealing surfaces,
said stinger having a plurality of annular recesses spaced along its tapered exterior sidewall and having a passageway connected to each of the recesses extending upwardly through said stinger,
said receptacle having a plurality of fluid openings through said receptacle each of which is spaced in communication with one of the annular recesses in said stinger,
annular resilient seals about the tapered surface of the stinger spaced between each recess, and
interlocking means on said receptacle and stinger coacting to releasably interlock said receptacle and stinger together.

2. The apparatus of claim 1 including,
a second annular seal between said recesses on the stinger,
a vent passageway leading from the surface of the stinger from between each pair of annular seals between adjacent recesses.

3. The apparatus of claim 1 wherein the interlocking means includes,
a notch in the interior of the receptacle having an upwardly tapered shoulder,
a plurality of locking balls carried by the stinger and adapted to be positioned adjacent the notch when the stinger is seated in the receptacle, and
a wedge member slidably carried by the stinger interiorly of said locking balls whereby when the stinger is seated the wedge member may be removed downwardly to move the balls laterally into the notch thereby locking the stinger to the receptacle.

4. The apparatus of claim 1 including,
an interlocking shoulder on the receptacle,
interlocking means pivotally carried by the stinger,
fluid actuating means for moving said interlocking means into engagement with the interlocking shoulder for interlocking the receptacle and stinger, said interlocking means including,
at least one lever pivotal about an axis member for engagement with said shoulder,
load-bearing surfaces on said lever and on said actuating means, said surfaces being in mating engagement when said lever engages said shoulder, whereby any load transmitted to the lever from said shoulder is borne by said surfaces rather than the axis member.

5. The apparatus of claim 1 including,
a protecting shield disposed about and connected to the stinger, and
guide means for telescopically aligning the stinger for telescopic insertion in the receptacle.

6. The apparatus of claim 1 and including,
a flexible closure member connected to the top of the receptacle and closing the opening, said member including a normally closed slot which prevents circulation of water therethrough but which opens to allow passage of said stinger.

7. The apparatus of claim 6 including,
a second flexible closure member connected to the bottom of said receptacle covering said opening and preventing circulation of water from the outside of said receptacle into said opening.

8. An underwater connecting apparatus comprising,
a receptacle having an interior opening with evenly and gradually tapered sidewalls and being adapted to be positioned underwater,
a stinger having an evenly and gradually tapered exterior sidewall adapted to be telescoped into and out of said receptacle opening,
a protecting shield disposed about and connected to the stinger,
guide means for telescopically aligning the stinger for insertion into the receptacle,
said stinger having a plurailty of annular recesses spaced along its exterior sidewall and having a passageway connected to each of the recesses extending upwardly through said stinger,
said receptacle having a plurality of fluid openings through the receptacle each of which is in communication with one of the annular recesses in the stinger when the stinger is seated in the receptacle,
a pair of sealing means about the stinger between each of the annular recesses, and
a vent passageway leading from between each pair of sealing means.

9. The apparatus of claim 8 including,
the opening of the receptacle extending through the receptacle at the top and bottom,
two resilient closure members one connected to the receptacle at the top and one to the bottom enclosing said opening, said members each including a normally closed slot which prevents circulation of water therethrough.

10. An underwater connecting apparatus comprising,
a receptacle adapted to be positioned underwater, and including,
an interlocking shoulder,
a stinger, at least a portion of which is adapted to be telescoped into and out of said receptacle,
interlocking means on said stinger,
fluid actuating means for moving said interlocking means into engagement with said shoulder for interlocking said receptacle and stinger,
surfaces on the stinger and the receptacle which are in mating engagement when said stinger portion is fully telescoped into said receptacle,
passageway means for conveying the actuating fluid to said actuating means and including,
a first outlet for actuation of said actuating means by said fluid, and a second outlet in said mating surface on the stinger for the dumping of said fluid until said stinger portion is fully telescoped into the receptacle and said surfaces are in mating engagement.

11. An underwater connecting apparatus comprising, a receptacle adapted to be positioned underwater, a tapered stinger adapted to be telescoped into and out of said receptacle,
said receptacle and stinger having tapered coacting metal sealing surfaces,
said stinger having a plurality of annular recesses spaced along its tapered exterior and having a passageway connected to each of the recesses extending upwardly through said stinger,
said receptacle having a plurality of fluid openings through said receptacle each of which is spaced in communication with one of the annular recesses in said stinger,
annular resilient seals about the tapered surface of the stinger spaced between each recess,
interlocking means on said receptacle and stinger coacting to releasably interlock said receptacle and stinger together, said interlocking means being further defined as including,
an interlocking shoulder on the receptacle,
interlocking means pivotally carried by the stinger,
fluid actuating means for moving said interlocking means into engagement with the interlocking shoulder for interlocking the receptacle and stinger, and
spring means yieldably urging the interlocking means into the disengaging position.

12. An underwater connecting apparatus comprising,
a receptacle adapted to be positioned underwater,
a tapered stinger adapted to be telescoped into and out of said receptacle,
said receptacle and stinger having tapered coacting metal sealing surfaces,
said stinger having a plurality of annular recesses spaced along its tapered exterior and having a passageway connected to each of the recesses extending upwardly through said stinger,
said receptacle having a plurality of fluid openings through said receptacle each of which is spaced in communication with one of the annular recesses in said stinger,
annular resilient seals about the tapered surface of the stinger spaced between each recess,
interlocking means on said receptacle and stinger coacting to releasably interlock said receptacle and stinger together, said interlocking means being further defined as including,
an interlocking shoulder on the receptacle,
interlocking means pivotally carried by the stinger,
fluid actuating means for moving said interlocking means into engagement with the interlocking shoulder for interlocking the receptacle and stinger,
at least one lever for engagement with said shoulder,
load-bearing surfaces on said lever and on said actuating means, said surfaces being in mating engagement when said lever engages said shoulder, whereby any load transmitted to the lever from said shoulder is borne by said surfaces,
an actuating link for said lever, and
a pin pivotally connecting said link to said lever in a loose fit, whereby movement of the actuating means is transmitted to the lever through said link but any load received by said lever is borne by said load-bearing surfaces rather than by said pin.

13. An underwater connecting apparatus comprising,
a receptacle adapted to be positioned underwater, said receptacle having first and second ends and a receptacle opening extending from the first end to the second end,
a tapered stinger adapted to be telescoped into and out of said opening from the first end of the receptacle,
said receptacle and stinger having tapered coacting metal sealing surfaces,
said stinger having a plurality of annular recesses spaced along its tapered exterior and having a passageway connected to each of the recesses extending upwardly through said stinger,
said receptacle having a plurality of fluid openings through said receptacle each of which is spaced in communication with one of the annular recesses in said stinger,
annular resilient seals about the tapered surface of the stinger spaced between each recess,
interlocking means on said receptacle and stinger coacting to releasably interlock said receptacle and stinger together, said interlocking means being further defined as including,
an interlocking shoulder on the receptacle,
interlocking means pivotally carried by the stinger,
fluid actuating means for moving said interlocking means into engagement with the interlocking shoulder for interlocking the receptacle and stinger, said actuating means being further defined as including,
at least one piston for reciprocating movement,
a link rotatably connected to said piston about a first pivotal axis, said interlocking means being defined as including,
a lever rotatably connected to said link about a second pivotal axis for rotation into and out of engagement with said shoulder as said piston moves, the first pivotal axis being located further from said first end than is said second pivotal axis when said lever is engaged with said shoulder.

14. The invention of claim 13 and including,
a plurality of said levers,
a link for each of said levers, said links being rotatably connected to their respective levers about second pivotal axes and connected to said piston about first pivotal axes for movement of the levers into and out of engagement as said piston moves, the first pivotal axis of each link being further from the first end of said receptacle than is the second pivotal axis of said link when the lever connected to said link is in engagement with said shoulder.

15. An underwater connecting apparatus comprising,
a receptacle adapted to be positioned underwater, said receptacle having first and second ends,
a tapered stinger adapted to be telescoped into and out of said receptacle,
said receptacle and stinger having tapered coacting metal sealing surfaces,
said stinger having a plurality of annular recesses spaced along its tapered exterior and having a passageway connected to each of the recesses extending upwardly through said stinger,
said receptacle having a plurality of fluid openings through said receptacle each of which is spaced in communication with one of the annular recesses in said stinger,
annular resilient seals about the tapered surface of the stinger spaced between each recess,
interlocking means on said receptacle and stinger coacting to releasably interlock said receptacle and stinger together, said interlocking means being further defined as including,
an interlocking shoulder adjacent the first end of the receptacle,
interlocking means pivotally carried by the stinger,
fluid actuating means for moving said interlocking means into engagement with the interlocking shoulder for interlocking the receptacle and stinger,
a passageway extending through the stinger, and
a passageay in the second end of the receptacle in mating engagement with said first mentioned passageway.

16. An underwater connecting apparatus comprising, a receptacle adapted to be positioned underwater,
a tapered stinger adapted to be telescoped into and out of said receptacle,
said receptacle and stinger having tapered coacting metal sealing surfaces,
said stinger having a plurality of annular recesses spaced along its tapered exterior and having a passageway connected to each of the recesses extending upwardly through said stinger,
said receptacle having a plurality of fluid openings through said receptacle each of which is spaced in communication with one of the annular recesses in said stinger,
annular resilient seals about the tapered surface of the stinger spaced between each recess,
interlocking means on said receptacle and stinger coacting to releasably interlock said receptacle and stinger together, said interlocking means being further defined as including,
an interlocking shoulder on the receptacle,
interlocking means pivotally carried by the stinger,
fluid actuating means for moving said interlocking means into engagement with the interlocking shoulder for interlocking the receptacle and stinger, said fluid actuating means being further defined as including,
a piston,
passageway means for conveying the actuating fluid to said piston, said passageway means including,
a first outlet to said piston for moving said piston with said fluid,
a second outlet in one of said tapered metal sealing surfaces of the stinger and in fluid communication with the first outlet, whereby the fluid will normally pass through said second outlet due to the resistance of the piston to passage of fluid through the first outlet except when the sealing surfaces are together, thus closing the second outlet and forcing the fluid through the first outlet, whereby the piston is forced to move.

17. An underwater connecting apparatus comprising,
a receptacle having an interior opening adapted to be positioned underwater,
a stinger adapted to be telescoped into and out of said receptacle openings,
a protecting shield disposed about and connected to the stinger,
guide means for telescopically aligning the stinger for insertion into the receptacle,
said stinger having a plurality of annular recesses spaced along its exterior and having a passageway connected to each of the recesses extending upwardly through said stinger,
said receptacle having a plurality of fluid openings through the receptacle each of which is in communication with one of the annular recesses in the stinger when the stinger is seated in the receptacle,
a pair of sealing means about the stinger between each of the annular recesses,
a vent passageway leading from between each pair of sealing means,
the opening of the receptacle extending through the receptacle at the top and bottom,
two resilient closure members one connected to the receptacle at the top and one to the bottom enclosing said opening, said members each including a normally closed slot which prevents circulation of water therethrough, and
a resilient closure member connected to the lower end of the protecting shield and enclosing the stinger, said member including a normally closed slot which prevents the passage of debris into the shield but allows the passage of the stinger therethrough.

18. The apparatus of claim 17 including,
an interlocking shoulder on the receptacle,
interlocking means pivotally carried by the stinger,
fluid actuating means for moving said interlocking means into engagement with the interlocking shoulder for interlocking the receptacle and stinger.

References Cited

UNITED STATES PATENTS

| | | | |
|---|---|---|---|
| 2,873,810 | 2/1959 | Orton | 285—190 X |
| 2,990,851 | 7/1961 | Jackson et al. | 137—236 X |
| 3,065,763 | 11/1962 | Howard | 137—223 |
| 3,086,590 | 4/1963 | Jackson et al. | 166—.6 |
| 3,142,337 | 7/1964 | Poorman et al. | 166—.6 |
| 3,147,992 | 9/1964 | Haeber et al. | 285—18 |
| 3,180,420 | 4/1965 | Manson et al. | 137—454.2 X |
| 3,183,946 | 5/1965 | Tidwell | 141—371 |
| 3,236,302 | 2/1966 | Postlewaite | 175—7 |
| 3,237,220 | 3/1966 | Brandt | 285—190 X |
| 3,324,943 | 6/1967 | Price | 166—.6 |

JAMES A. LEPPINK, Primary Examiner

RICHARD E. FAVREAU, Assistant Examiner

PO-1050
(5/69)

UNITED STATES PATENT OFFICE
CERTIFICATE OF CORRECTION

Patent No. 3,486,556      Dated December 30, 1969

Inventor(s) Harry L. Burgess

It is certified that error appears in the above-identified patent and that said Letters Patent are hereby corrected as shown below:

Column 2, line 54, cancel "singer" and insert -- stinger --. Column 3, line 28, cancel "wellheal" and insert -- wellhead --; line 46, cancel "to" (first occurrence); line 57, cancel "stringer" and insert -- stinger --; and line 73, cancel "stringer" and insert -- stinger --. Column 4, line 7, cancel "vent" and insert -- event --. Column 7, line 5, cancel "achived" and insert -- achieved --; lines 10, 13, 19, and 39, cancel "stringer" and insert -- stinger --; and line 57, cancel "extending" and insert -- extended --. Column 10, delete lines 55 and 56 and insert -- receptacle at the top and one to the bottom enclosing said opening, said members each including --. Column 12, line 72, cancel "passageay" and insert -- passageway --. Column 13, line 45, cancel "openings" and insert -- opening --.

SIGNED AND
SEALED
JUN 23 1970

(SEAL)
Attest:

Edward M. Fletcher, Jr.
Attesting Officer

WILLIAM E. SCHUYLER, JR.
Commissioner of Patents